United States Patent
Saudemont

(10) Patent No.: US 10,023,018 B2
(45) Date of Patent: Jul. 17, 2018

(54) FUSIBLE LINKING YOKE BETWEEN THE SUSPENSION ARM AND THE ENGINE CRADLE

(71) Applicant: RENAULT s.a.s., Boulogne Billancourt (FR)

(72) Inventor: Yoann Saudemont, Les Pinthieres (FR)

(73) Assignee: RENAULT s.a.s., Boulogne Billancourt (FR)

( * ) Notice: Subject to any disclaimer, the term of this patent is extended or adjusted under 35 U.S.C. 154(b) by 180 days.

(21) Appl. No.: 15/112,615

(22) PCT Filed: Dec. 9, 2014

(86) PCT No.: PCT/FR2014/053244
§ 371 (c)(1),
(2) Date: Jul. 19, 2016

(87) PCT Pub. No.: WO2015/107274
PCT Pub. Date: Jul. 23, 2015

(65) Prior Publication Data
US 2016/0332496 A1    Nov. 17, 2016

(30) Foreign Application Priority Data

Jan. 20, 2014   (FR) .................... 14 50413

(51) Int. Cl.
*B60G 7/02*   (2006.01)
*F16F 7/12*   (2006.01)
*B62D 21/15*  (2006.01)

(52) U.S. Cl.
CPC ............ *B60G 7/02* (2013.01); *B62D 21/155* (2013.01); *F16F 7/12* (2013.01); *B60G 2204/14* (2013.01);

(Continued)

(58) Field of Classification Search
CPC .............. B60G 7/02; B60G 2204/4302; B60G 2204/143; B60G 2206/016;

(Continued)

(56) References Cited

U.S. PATENT DOCUMENTS 3,526,413 A * 9/1970 Muller ..................... B60G 7/02
                                                       280/86.756
4,267,896 A * 5/1981 Hendriksen ............ B60G 9/003
                                                       267/66

(Continued)

FOREIGN PATENT DOCUMENTS

DE    10 2008 000 936 A1    10/2009

OTHER PUBLICATIONS

International Search Report dated Mar. 20, 2015 for PCT/FR2014/053244 filed on Dec. 9, 2014.

(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

An arrangement for a motor vehicle includes a suspension arm, an engine cradle, a wheel attached to the suspension arm, at least one intermediate linking fork joint disposed between the suspension arm and the engine cradle to ensure attachment of the suspension arm to the engine cradle, removable elements to attach the linking fork joint to the engine cradle, elements to attach the suspension arm to the linking fork joint, and first fusible elements to allow a first relative displacement of the suspension arm with respect to the engine cradle over a first path only in an event of application, to the wheel or to the suspension arm, of an external force having a lateral component that exceeds a first predetermined threshold for which the first fusible elements (Continued)

are sized. The first fusible elements include at least one portion of the linking fork joint.

17 Claims, 5 Drawing Sheets

(52) U.S. Cl.
CPC .............. *B60G 2204/143* (2013.01); *B60G 2204/4302* (2013.01); *B60G 2206/016* (2013.01); *B60G 2206/10* (2013.01); *Y10T 403/11* (2015.01)

(58) Field of Classification Search
CPC ... B60G 2206/10; B60G 2204/14; F16F 7/12; Y10T 403/11; B62D 21/155
See application file for complete search history.

(56) References Cited

U.S. PATENT DOCUMENTS

| | | | | |
|---|---|---|---|---|
| 4,392,623 A | * | 7/1983 | Munsen | B64C 25/10 244/102 R |
| 4,921,271 A | * | 5/1990 | Berry | B62D 17/00 280/86.756 |
| 4,969,634 A | * | 11/1990 | Bellingham | F16F 1/3686 267/260 |
| 5,052,711 A | * | 10/1991 | Pirkey | B62D 17/00 280/86.753 |
| 5,080,388 A | * | 1/1992 | Berry | B60G 3/20 280/124.136 |
| 5,398,411 A | * | 3/1995 | Kusaka | B23P 13/04 280/124.134 |
| 5,443,281 A | * | 8/1995 | Burkard | B60G 7/02 280/93.502 |
| 5,775,719 A | | 7/1998 | Holden | |
| 6,224,075 B1 | * | 5/2001 | McIntyre | B60G 7/005 280/86.751 |
| 6,308,809 B1 | * | 10/2001 | Reid | F16F 7/125 188/377 |
| 6,457,728 B1 | * | 10/2002 | Klais | B60G 7/02 280/86.75 |
| 6,478,318 B1 | * | 11/2002 | Allman | B60G 3/265 280/86.751 |
| 6,688,616 B1 | * | 2/2004 | Ziech | B60G 7/02 280/86.751 |
| 6,994,374 B2 | * | 2/2006 | Miyasaka | B60G 7/02 280/784 |
| 7,083,176 B2 | * | 8/2006 | Soles | B60G 7/02 280/86.751 |
| 7,513,514 B1 | * | 4/2009 | Schlosser | B60G 7/005 280/86.751 |
| 7,571,917 B2 | * | 8/2009 | Ruehe | B60G 7/001 180/274 |
| 8,366,045 B2 | * | 2/2013 | Goncalves De Oliveira | G01L 1/06 244/108 |
| 8,746,714 B2 | * | 6/2014 | Frens | B60G 7/003 280/86.753 |
| 9,115,778 B2 | * | 8/2015 | Wagner | B60G 11/08 |
| 9,500,249 B2 | * | 11/2016 | Ludin | F16F 7/12 |
| 9,724,975 B2 | * | 8/2017 | Krahn | B60G 7/008 |
| 2002/0180171 A1 | * | 12/2002 | Hasebe | B60G 7/02 280/124.134 |
| 2015/0158456 A1 | * | 6/2015 | Cheng | B60N 2/2812 297/480 |
| 2016/0207369 A1 | * | 7/2016 | Krahn | F16F 1/26 |

OTHER PUBLICATIONS

French Search Report dated Jun. 20, 2014 for FR 1450413 filed on Jan. 20, 2014.

* cited by examiner

FUSIBLE LINKING YOKE BETWEEN THE SUSPENSION ARM AND THE ENGINE CRADLE

TECHNICAL FIELD OF THE INVENTION

The invention relates to the field of the attachment of a suspension arm to an engine cradle in a motor vehicle.

More particularly, the object of the invention is an arrangement for a motor vehicle comprising a suspension arm, an engine cradle, a wheel attached to the suspension arm by means of a stub axle and an intermediate linking fork joint disposed between the suspension arm and the engine cradle to ensure the complete or partial attachment of the suspension arm to the engine cradle. It also relates to a motor vehicle comprising at least one arrangement of this kind.

STATE OF THE ART

In motor vehicle design, the management of shocks sustained by the wheels is problematic. Shocks should be resisted as far as possible in order to uphold passenger safety at the same time as preventing damage to the vehicle, particularly in relation to the structural body shell and the suspension arms. This involves management of the lateral component of the external forces oriented in the lateral direction of the vehicle corresponding to the width of the vehicle and, at the same time, management of the longitudinal component of the external forces oriented in the longitudinal direction of the vehicle corresponding to the length of the vehicle.

There are problems at present in obtaining an effective balance between the longitudinal shock strength of the suspension arms and a lateral shock fusibility capacity.

Current solutions offer a combination of the longitudinal and lateral shock performance which does not allow the demands in terms of mechanical strength with respect to shocks applied to the wheel to be met correctly. One technique involves providing fusible means integral with the suspension arm. In the event of a shock, the suspension arm has to be replaced, something that is particularly time-consuming and impractical.

Moreover, an uncapping phenomenon of the ball joint between the suspension arm and the stub axle frequently occurs following failure of the arm in the event of a shock resisted by the wheel, which causes loss of control of the vehicle.

OBJECT OF THE INVENTION

The aim of the present invention is to propose a motor vehicle arrangement which overcomes the difficulties outlined above.

In particular, one object of the invention is to provide an arrangement which allows:
  lateral fusibility uncoupled from longitudinal fusibility to be provided,
  a less time-consuming solution to be proposed with a fusible part distinct from the suspension arm and the engine cradle,
  the uncapping phenomenon of the ball joint mounting of the suspension arm on the stub axle to be avoided in the event of a shock sustained by the wheel.

This object can be achieved by means of an arrangement for a motor vehicle comprising a suspension arm, an engine cradle, a wheel attached to the suspension arm and at least one intermediate linking fork joint disposed between the suspension arm and the engine cradle to ensure the complete or partial attachment of the suspension arm to the engine cradle, removable elements for attaching the linking fork joint to the engine cradle, elements for attaching the suspension arm to the linking fork joint, first fusible elements configured in such a manner as to allow a first relative displacement of the suspension arm with respect to the engine cradle over a first path only in the event of application, to the wheel and/or to the suspension arm, of an external force, the lateral component of which, measured in a lateral direction of the vehicle, exceeds a first predetermined threshold for which the first fusible elements are sized, the first fusible elements comprising at least one portion of the linking fork joint.

According to one embodiment, the first fusible elements are configured in such a manner as to prevent the first relative displacement over the first path if the lateral component of said external force is below the first predetermined threshold and whatever the value of the longitudinal component of said external force measured in a longitudinal direction of the vehicle.

The linking fork joint may be configured and inserted in relation to the engine cradle and the suspension arm in such a manner that the first relative displacement over the first path is carried out in the lateral direction of the vehicle and in a first direction from the wheel towards the engine cradle.

According to another embodiment, the elements for attaching the suspension arm to the linking fork joint comprise a unit mounted on the suspension arm, particularly a nut and bolt, and the first fusible elements comprise a first guide element integral with the linking fork joint configured so as to guide a first displacement of the unit with respect to the linking fork joint along a trajectory and along the first guide element corresponding to said first path and a first locking element configured to break only if the lateral component of the external force exceeds the first predetermined threshold, the first displacement of the unit only being allowed in the event of breakage of the first locking element.

The elements for attaching the suspension arm to the linking fork joint may comprise a unit mounted on the suspension arm, particularly a nut and bolt, and the first fusible elements may comprise at least one wing to which the unit is attached and configured so as to be plastically deformed only if the lateral component of the external force exceeds the first predetermined threshold, the plastic deformation of the wing that results from this accompanying a displacement of the unit along a trajectory in relation to the engine cradle corresponding to said first path.

The arrangement may comprise second fusible elements independent of and disassociated from the first fusible elements and configured to allow a second relative displacement of the suspension arm in relation to the engine cradle over a second path only in the event of application, to the wheel and/or to the suspension arm, of an external force, the longitudinal component of which, measured in the longitudinal direction of the vehicle, exceeds a second predetermined threshold for which the second fusible elements are sized, the second fusible elements comprising at least a portion of the linking fork joint.

The second fusible elements are preferably configured to prevent the second relative displacement over the second path if the longitudinal component of the external force is below the second predetermined threshold and whatever the value of the lateral component of the external force measured in the lateral direction of the vehicle.

The linking fork joint may be configured and inserted with respect to the engine cradle and the suspension arm in such a manner that the second relative displacement over the second path is performed in the lateral direction and in a second direction from the engine cradle towards the wheel.

The elements for attaching the suspension arm to the linking fork joint comprise a unit mounted on the suspension arm, in particular a nut and bolt, and the second fusible elements comprise a second guide element integral with the linking fork joint configured to guide a second displacement of the unit with respect to the linking fork joint along a trajectory along the second guide element corresponding to said second path and a second locking element configured to break only if the longitudinal component of said external force exceeds the second predetermined threshold, the second displacement of the unit only being allowed in the event of a breakage of the second locking element.

According to one embodiment, the first and second guide elements comprise a guide rail penetrated by at least a portion of said unit, the first and second locking elements being disposed, prior to the breakage of at least one of the first and second locking elements, due to the application of the external force, on either side of said unit in the sliding direction defined by the guide rail.

The attachment of the suspension arm to the engine cradle may comprise a ball-joint mounting system different from the linking fork joint, the attachment point conferred by the linking fork joint and the attachment point conferred by this ball-joint mounting system being offset with respect to one another in the longitudinal direction of the vehicle.

The arrangement may comprise a second linking fork joint mounted between the ball-joint mounting system and the engine cradle, of the same kind as the linking fork joint linked to the attachment elements but different therefrom.

The attachment elements preferably ensure a ball-joint link between the linking fork joint and the suspension arm and the linking fork joint is housed between said ball-joint link and the engine cradle.

A motor vehicle may comprise at least one arrangement of this kind.

BRIEF DESCRIPTION OF THE DRAWINGS

Other advantages and characteristics will emerge more clearly from the following description of particular embodiments of the invention provided by way of non-limiting examples and represented in the attached drawings in which.

DESCRIPTION OF PREFERRED
EMBODIMENTS OF THE INVENTION

Figure 1:
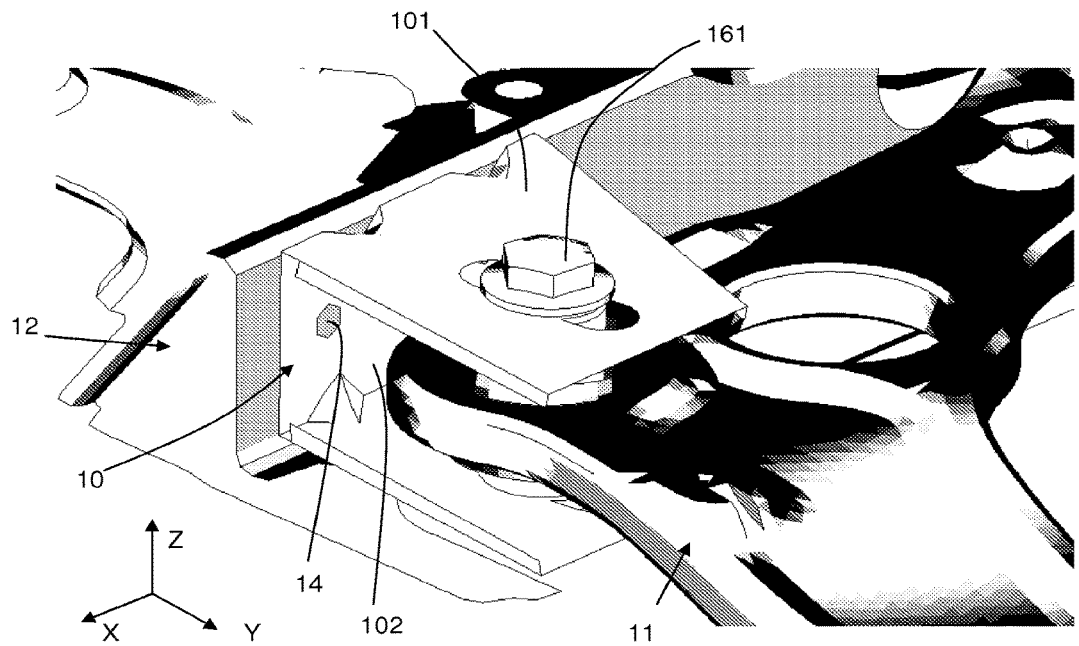
FIG. 1 is a perspective view partially representing a first embodiment of the arrangement according to the invention.
Figure 2:
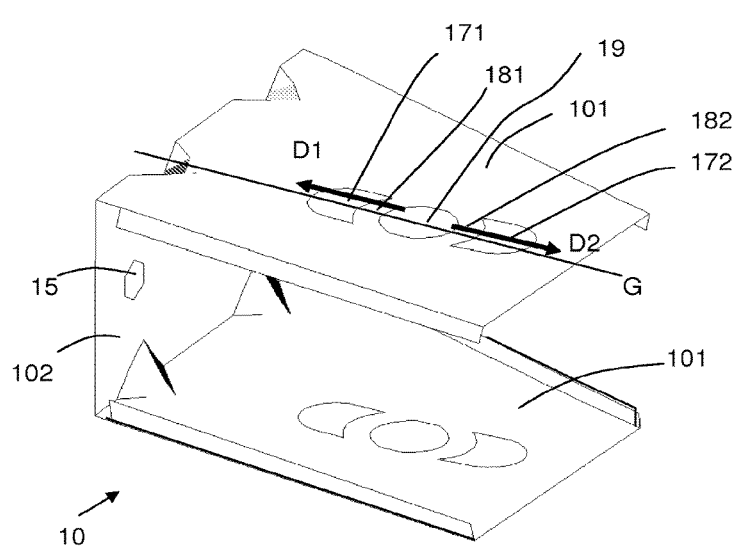
FIG. 2 is a perspective view representing the linking fork joint in FIG. 1.
Figure 3:
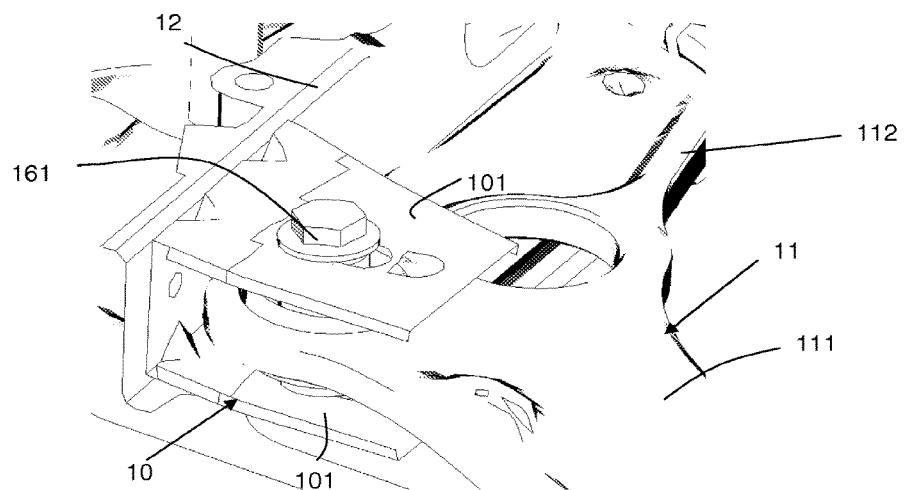
FIG. 3 is an identical view to FIG. 1 but illustrates the situation following actuation of the first fusible elements.
Figure 4:
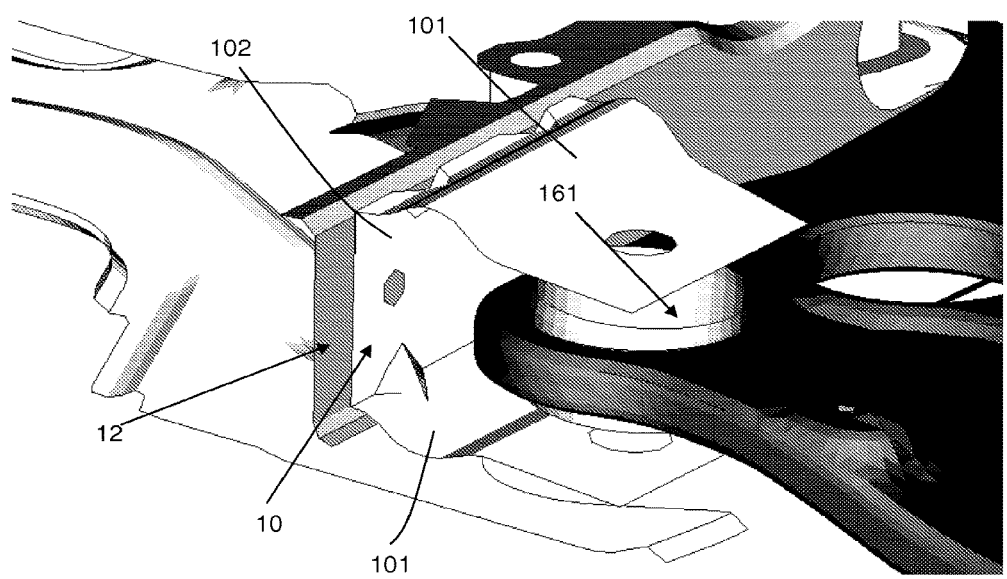
FIGS. 4 and 5 are perspective views partially representing a second embodiment of the arrangement according to the invention.
Figure 5:
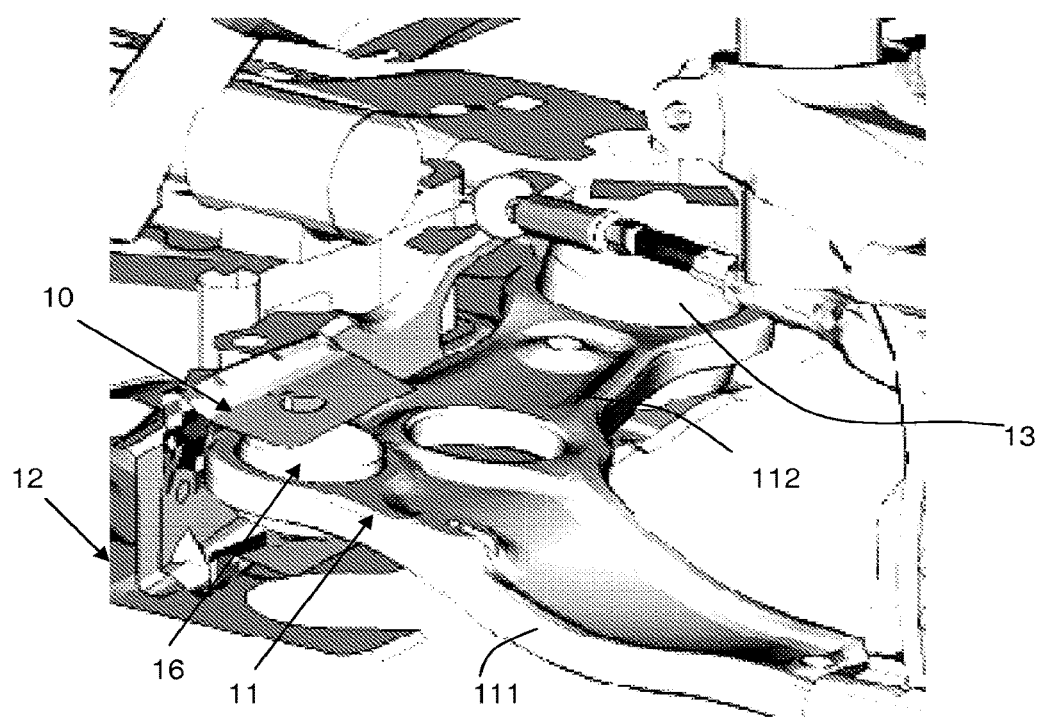

The invention will now be described with reference to FIGS. 1 to 13. A first embodiment is represented in FIGS. 1 to 3, whereas a second embodiment is represented in FIGS. 4 to 13. The second embodiment, the principle of which can be seen in FIGS. 4 and 5, is moreover specified by means of four examples in FIGS. 6 to 13. The same reference numbers are retained from one embodiment to the next for identical parts or parts which have the same functions.

For greater understanding, an orthonormal point of reference is associated with the arrangement for a motor vehicle, with:
 a longitudinal direction referred to as X which corresponds to the direction along which the length of the vehicle is measured and normally corresponding to the front-back displacement direction,
 a lateral direction referred to as Y which corresponds to the direction along which the width of the vehicle is measured and which is normally horizontal,
 a vertical direction Z jointly perpendicular to the longitudinal X and lateral Y directions which corresponds to the direction along which the height of the vehicle is measured and which is normally vertical.

The arrangement for a motor vehicle comprises a suspension arm 11, an engine cradle 12, a wheel (not shown) attached to the suspension arm 11 by means of a stub axle shown on the right in FIG. 5 and a linking fork joint 10 disposed in an intermediate manner between the suspension arm 11 and the engine cradle 12. The linking fork joint 10 ensures the suspension arm 11 is completely or partially attached to the engine cradle 12. In particular, it ensures a portion of the complete attachment in the event that the attachment of the suspension arm 11 to the engine cradle 12 comprises, in addition to the fork joint 10, a ball-joint mounting system 13 distinct from the linking fork joint 10, the attachment point conferred by the linking fork joint 10 and the attachment point conferred by this ball-joint mounting system 13 being offset in respect of one another in the longitudinal direction X of the vehicle. This is, in particular, what is referred to as a lower suspension arm 11.

To be more precise, the suspension arm 11 comprises a first branch 111 having a first distal lateral end, in other words opposite the engine cradle 12 in the lateral direction Y, and a second proximal lateral end facing away from the side of the engine cradle 12. It also comprises a second branch 112 substantially oriented in the longitudinal direction X, extending along one edge of the engine cradle 12, having a first longitudinal end and a second longitudinal end. The first branch 111 originates from the second branch 112 at the first longitudinal end. In other words, the zone of the first longitudinal end of the second branch 112 coincides with the zone of the second proximal lateral end of the first branch 111, such that the two branches 111, 112 are connected to one another to form a suspension arm 11 having the shape of an "L" overall in a plane (X, Y). For its part, the ball-joint mounting system 13 is disposed at the second longitudinal end of the second branch 112. The first distal lateral end of the first branch 111 for its part carries a wheel support, particularly of the stub axle type (not shown).

The arrangement comprises removable elements 14 for attaching the linking fork joint 10 to the engine cradle 11. In particular, these are elements 14 which ensure screw-fixing, making them removable by an unscrewing action of the elements 14. Elements of this kind may be made up of simple screws crossing a lumen 15 formed in the linking fork joint 10. They allow the linking fork joint to be made advantageously interchangeable, particularly following the use of its fusible elements which will be described further on, in the event of a shock being applied to the wheel.

The arrangement also comprises elements 16 for attaching the suspension arm 11 to the linking fork joint 10. The elements 16 for attaching the suspension arm 11 to the linking fork joint 10 particularly comprise a unit 161 mounted on the suspension arm 11, particularly a nut and bolt comprising a threaded screw and at least one nut screwed onto this screw. The cooperation between the screw and said at least one nut is such that the fork joint 10 and the suspension arm 11 are held tightly locally and attached by this effect at the unit 161.

The attachment elements 16 ensure a ball-joint link between the linking fork joint 10 and the suspension arm 11, and the linking fork joint 10 is housed between said ball-joint link and the engine cradle 12.

The arrangement advantageously comprises first fusible elements configured to allow a first relative displacement D1 of the suspension arm 11 in relation to the engine cradle 12 over a first path only in the event of the application, to the wheel and/or the suspension arm 11, of an external force, the lateral component FY of which measured in the lateral direction Y of the vehicle exceeds a first predetermined threshold for which the first fusible elements are sized, the first fusible elements comprising at least a portion of the linking fork joint 10.

The nature of the first fusible elements distinguishes the first and second embodiments, the nature of the linking fork joint 10 being different from one to the other. These differences will be specified later.

The invention also relates to a motor vehicle comprising at least one such arrangement. In particular, two arrangements can be provided on the right and left sides of the engine cradle 12, respectively, which engine cradle is then common to the two arrangements. The right arrangement puts into operation the right suspension arm, the right wheel, a right linking fork joint. The left arrangement comprises the left suspension arm, the left wheel and the left linking fork joint. The right linking fork joint is fixed removably via its elements 14 to the right lateral edge of the engine cradle. The left linking fork joint is removably fixed via its elements 14 to the left lateral edge of the engine cradle.

The first fusible elements are very advantageous in allowing a relative movement between the suspension arm and the engine cradle 12, only in the event of a lateral force exceeding the first predetermined threshold, and avoiding any damage to the engine cradle and the suspension arm 11. In the event of the implementation of the first displacement D1 over the first path, only the linking fork joint 10, the first fusible elements of which have been previously activated, has to be replaced and one of the advantages of envisaging removable elements 14 for attaching the linking fork joint 10 to the engine cradle 12 is to be able to interchange the linking fork joint.

The first fusible elements are configured in such a manner as to prevent the first relative displacement D1 over the first path if the lateral component FY of said external force is below the first predetermined threshold and whatever the value of the longitudinal component FX of said external force measured in the longitudinal direction X of the vehicle. In other words, the value of FX has no effect on the state or the behavior of the first fusible elements.

The linking fork joint 10 is configured and inserted in relation to the engine cradle 12 and the suspension arm in such a manner that the first relative displacement D1 over the first path is performed in the lateral direction Y of the vehicle and in a first direction from the wheel towards the engine cradle 12. During the course of this movement, the suspension arm 11 can pivot as a whole about the ball-joint mounting system 13, while remaining whole.

In each of the first and second embodiments, the linking fork joint 10 exhibits a general U-shape with two deformable parallel wings 101 (second embodiment) or provided with a guide rail (first embodiment). The two wings 101 extend in the lateral direction Y, each in particular being included in a plane (X, Y). They all have two points of origin in a base 102 attached to the engine cradle 12 via the removable attachment elements 14. Each lumen 15 is formed in the base 102. For their part, the two wings allow the attachment of the unit 161 at a position at distance according to Y in relation to the base 102 and therefore in relation to the engine cradle 12. The interposition of this distance must be greater than the first path envisaged for the first relative displacement D1 between the suspension arm 11 and the engine cradle 12. It is still true, however, that the linking fork joint 10 may be any shape.

According to the first embodiment, the first fusible elements comprise a first guide element 171 integral with the linking fork joint 10 configured to guide a first displacement of the unit 161 with respect to the linking fork joint 10 over a trajectory and along the first guide element 171 corresponding to the first path of the first relative displacement D1 and a first locking element 18 configured to break only if the lateral component FY of the external force exceeds the first predetermined threshold, the first displacement of the unit 161 only being allowed in the event of the first locking element 171 breaking.

In this first embodiment, there is therefore the implementation of a relative sliding between the linking fork joint 10 and the suspension arm 11, by the sliding of the unit 161 along the first guide element 171. The wings 101 retain their shape and completeness. Only the first locking element 181 is sized to break at the moment when FY exceeds the first threshold. The value of the component FX has no influence on the behavior and the state of the first locking element 181.

Now according to the second embodiment, the first fusible elements comprise at least one wing 101 of the fork joint 10 to which the unit 161 is attached and configured in such a manner as to be plastically deformed only if the lateral component FY of the external force is greater than the first predetermined threshold, the plastic deformation of the wing 101 which results from this accompanying a displacement of the unit 161 along a trajectory in relation to the engine cradle 12 corresponding to the first path of the first relative displacement D1.

The second embodiment therefore involves the implementation of a plastic deformation of at least one wing 101 of the fork joint to which the unit 161 is fixed. In the second embodiment shown in FIGS. 4 to 13, the unit 161 is attached to the two wings 101 of the fork joint 10 and the two wings 101 of the fork joint 10 are configured in such a manner as to be plastically deformed when FY is greater than the first threshold. The value of the component FX has no influence on the behavior and the compression state of the two wings 101. The second force threshold FX can be dealt with using a second linking fork joint at the level of the system 13. The arrangement then comprises a second linking fork joint mounted between the ball-joint mounting system 13 and the engine cradle 12, of the same nature as the linking fork joint 10 linked with the attachment elements 16 but different therefrom. First and possible second fusible elements are likewise provided between this second linking fork joint and the system 13.

FIGS. 6 to 13 vary from one another in terms of the design of the removable attachment elements 14 and the nature of the wings 101. FIGS. 6, 8, 10 and 12 represent the linking fork joint 10 prior to the plastic deformation of the wings 101. FIGS. 7, 9, 11 and 13 then show the situation following the plastic deformation resulting from the application of a lateral component FY having a value exceeding the first predetermined threshold. When undergoing plastic deformation under the effect of the component FY, each wing 101 reduces its length in the lateral direction Y in a manner leading to a displacement of the unit 161 according to Y in the direction of the engine cradle 12 and corresponding to the first relative displacement D1.

Figure 6:
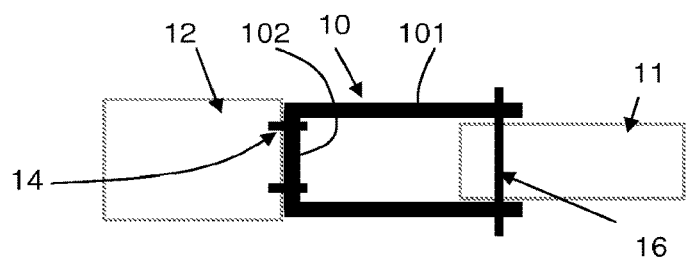
FIGS. 6 and 7 represent a first example of the second embodiment before and after actuation of the first fusible elements, respectively.
Figure 7:
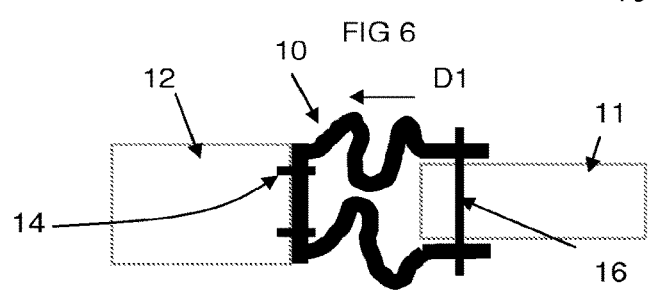

In FIGS. 6 and 7, the first example of the second embodiment envisages first fusible elements obtained with two planar, parallel wings 101, the base 102 of the linking fork joint 10 being laterally screwed in the lateral direction Y in the engine cradle 12.

Figure 8:
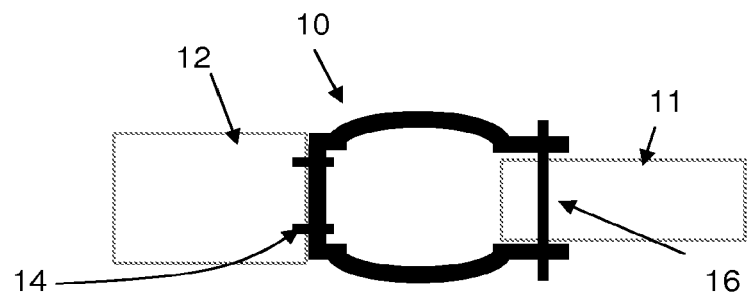
FIGS. 8 and 9 represent a second example of the second embodiment before and after actuation of the first fusible elements, respectively.
Figure 9:
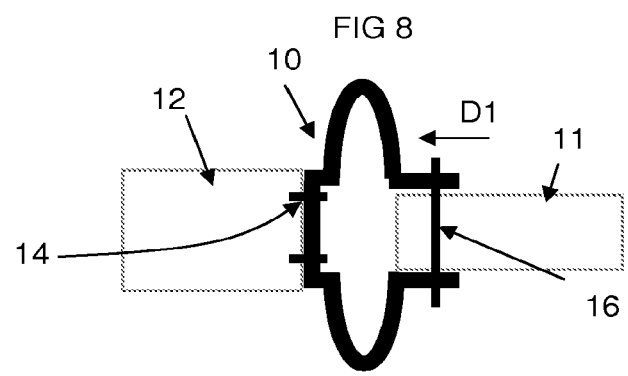

In FIGS. 8 and 9, the second example of the second embodiment envisages first fusible elements obtained with the help of two wings 101 bent over their length so as to favor their plastic deformation. The bent shape may be formed over the entire length of the wing 101 in the direction Y or only over a portion, as is illustrated in FIGS. 4 and 5. The effect of a bent shape of this kind is to constitute a preferential plastic deformation zone, preventing the wings 101 from becoming deformed or breaking outside the bent zones. The base 102 of the linking fork joint 10 is laterally screwed in the lateral direction Y in the engine cradle 12.

Figure 10:
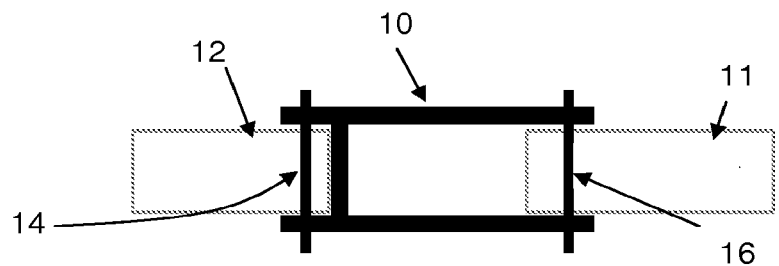
FIGS. 10 and 11 represent a third example of the second embodiment before and after actuation of the first fusible elements, respectively.
Figure 11:
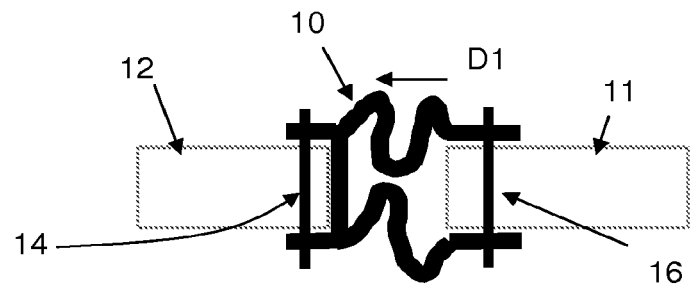

In FIGS. 10 and 11, the third example of the second embodiment envisages first fusible elements obtained with two planar, parallel wings 101, but unlike in the first example, the base 102 of the linking fork joint is mounted against the engine cradle 12 in the lateral direction Y, but screwed in the engine cradle in the vertical direction Z.

Figure 12:
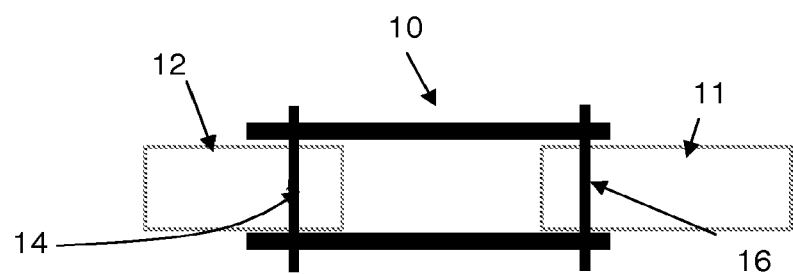
FIGS. 12 and 13 represent a fourth example of the second embodiment before and after actuation of the first fusible elements, respectively.
Figure 13:
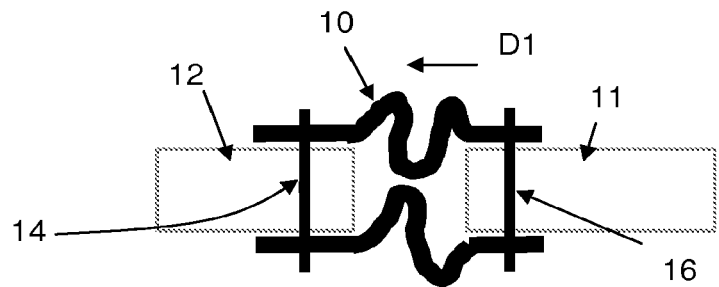

The fourth example of the second embodiment with reference to FIGS. 12 and 13 is a variant of the third example in which the base 102 of the linking fork joint 10 is screwed into the engine cradle 12 in the vertical direction Z but is not mounted against the engine cradle 12 in the lateral direction Y.

The advantages of the second embodiment are at least the following:
- longitudinal and lateral shocks are totally uncoupled, thanks to the fusible linking fork joint 10,
- the failure stress (especially in the case of lateral shock) is directed by the strength of the fork joint 10, so is easy to locate without being disturbed by the necessary longitudinal shock strength (because the fork joint 10 in this example works with lateral shock compression and longitudinal shock traction),
- absence of uncapping of the ball joint between the suspension arm 11 and the stub axle while the suspension arm 11 and the ball-joint blade remain whole,
- the fusible linking fork joint 10 is a small-sized piece of stamped metal, so is a relatively inexpensive compared with the arm 11 or an engine cradle 12,
- fusibility is guaranteed by a part other than the arm 11 and the engine cradle 12; these parts can therefore be manufactured in a lightweight material with low resistance to large-scale deformation, such as aluminum or a composite material.

Returning now to the first embodiment, the arrangement comprises second fusible elements independent of and dissociated from the first fusible elements and configured so as to allow a second relative displacement D2 of the suspension arm 11 in relation to the engine cradle 12 over a second path only in the event of application, to the wheel and/or the suspension arm 11, of an external force, the longitudinal component FX of which, measured in the longitudinal direction X of the vehicle, exceeds a second predetermined threshold for which the second fusible elements are sized, the second fusible elements comprising at least a portion of the linking fork joint 10.

The second fusible elements are configured so as to prevent the second relative displacement D2 over the second path if the longitudinal component FX of the external force is below the second predetermined threshold and whatever the value of the lateral component FY of the external force measured in the lateral direction Y of the vehicle. In other words, the value of FY has no influence on the state or behavior of the second fusible elements.

Hence, the fusibility conferred by the first fusible elements with respect to the lateral component FY of the external force is totally uncoupled from the fusibility conferred by the second fusible elements with respect to the longitudinal component FX of the external force.

The linking fork joint 10 is advantageously configured and inserted with respect to the engine cradle 12 and the suspension arm 11 in such a manner that the second relative displacement D2 over the second path is performed in the lateral direction Y and in a second direction from the engine cradle 12 towards the wheel. Over the course of this movement, the suspension arm 11 may pivot in its entirety about the ball-joint mounting system 13, while remaining whole.

The dissociation of the fusibility conferred by the fork joint 10 with respect to the lateral component FY, which is realized by a displacement D1 in a first direction, is total with respect to the fusibility conferred by the fork joint 10 with respect to the longitudinal component, which is realized by a displacement D2 in a second direction. Being guided in opposite directions, the dissociation of these two types of fusibility is complete. It is impossible for the first fusible elements to ensure any fusibility with respect to the longitudinal component FX of the external force. Likewise, it is impossible for the second fusible elements to be able to guarantee any fusibility with respect to the lateral component FY of the external force.

In the first embodiment, the second fusible elements comprise a second guide element 172 integral with the linking fork joint 10 configured so as to guide a second displacement of the unit 161 with respect to the linking fork joint 10 in a trajectory along the second guide element 172 corresponding to the second path of the second relative displacement D2 and a second locking element 182 configured to break only if the longitudinal component FX of the external force exceeds the second predetermined threshold, the second displacement of the unit 161 only being allowed in the event of the breakage of the second locking element 182.

With reference to FIG. 2, the first and second guide elements 171, 172 comprise a guide rail penetrated by at least one portion of the unit 161, the first and second locking elements 181, 182 being disposed, prior to the breaking of at least one of the first and second locking elements 181, 182 due to the application of the external force, on either side of the unit 161 in the sliding direction G defined by the guide rail. Prior to this breaking of the first locking element 181 if FY exceeds the first predetermined threshold or of the second locking element 182 if FX exceeds the second predetermined threshold, the unit 161 crosses the wing 101 across an opening 19 delimited on either side, in the sliding direction G, by the first and second locking elements 181, 182. Hence, each wing 101 comprises a guide rail of this kind, intended to be crossed by the unit 161. Each wing therefore comprises an opening 19, first and second locking elements 181, 182. For each wing 101, the first guide element 171 is formed by a first lumen made in the wing 101 in the direction G of the side opposite the opening 19 with respect to the first locking element 181. For each wing 101, the second guide element 172 is formed by a lumen made in the wing 101 in the direction G of the side opposite the opening 19 in relation to the second locking element 182. The first and second lumens are oriented in the alignment of one another on either side of the opening 19.

The advantages of this first embodiment are, among others:
 the failure stresses are totally uncoupled for lateral shock and for longitudinal shock and are directed by the strength of the first and second locking elements 181, 182 and the sliding of the screwed unit 161, so are easy to locate,
 no uncapping of the ball joint between the suspension arm 11 and the stub axle while the suspension arm 11 and the ball-joint blade remain complete,
 the fusible linking fork joint may particularly be obtained by stamping a small-sized sheet of metal, so it is relatively inexpensive compared with the price of a suspension arm 11 or an engine cradle 12.

Once the first locking element 181 or the second locking element 182 is damaged, depending on the nature of the shock sustained by the wheel, in other words depending on the value of its lateral component FY and its longitudinal component FX, the unit 161 may slide in the guide rail formed in each wing 101 of the linking fork joint 10 and thereby alter the topology of the undercarriage sufficiently to warn the driver.

The advantages are to provide an arrangement for a motor vehicle which allows:
 a lateral fusibility uncoupled from a longitudinal fusibility to be provided,
 a less time-consuming solution to be proposed, with a fusible part distinct from the suspension arm and the engine cradle, when repairs are carried out following a shock,
 the uncapping phenomenon of the ball-joint mounting of the suspension arm on the stub axle to be avoided in the event of a shock being sustained by the wheel.

The invention claimed is:

1. An arrangement for a motor vehicle, comprising:
 a suspension arm;
 an engine cradle;
 a wheel attached to the suspension arm;
 at least one intermediate linking fork joint disposed between the suspension arm and the engine cradle to ensure a complete or partial attachment of the suspension arm to the engine cradle;
 removable elements to attach the linking fork joint to the engine cradle;
 elements to attach the suspension arm to the linking fork joint; and
 first fusible elements configured to allow a first relative displacement of the suspension arm with respect to the engine cradle over a first path only in an event of application, to the wheel or to the suspension arm, of an external force having a lateral component, measured in a lateral direction of the vehicle, that exceeds a first predetermined threshold for which the first fusible elements are sized, the first fusible elements comprising at least one portion of the linking fork joint.

2. The arrangement as claimed in claim 1, wherein the first fusible elements are configured to prevent the first relative displacement over the first path when the lateral component of said external force is below the first predetermined threshold regardless of a value of a longitudinal component of said external force measured in a longitudinal direction of the vehicle.

3. The arrangement as claimed in claim 1, wherein the linking fork joint is configured and inserted in relation to the engine cradle and the suspension arm in such a manner that the first relative displacement over the first path is carried out in the lateral direction of the vehicle and in a first direction from the wheel towards the engine cradle.

4. The arrangement as claimed in claim 1, wherein the elements for attaching the suspension arm to the linking fork joint comprise a unit mounted on the suspension arm and wherein the first fusible elements comprise a first guide element integral with the linking fork joint configured to guide a first displacement of the unit with respect to the linking fork joint along a trajectory and along the first guide element corresponding to said first path and a first locking element configured to break only when the lateral component of the external force exceeds the first predetermined threshold, the first displacement of the unit only being allowed in the event of breakage of the first locking element.

5. The arrangement as claimed in claim 4, wherein the unit of the elements for attaching the suspension arm to the linking fork joint includes a nut and bolt.

6. The arrangement as claimed in claim 4, further comprising second fusible elements independent of and disassociated from the first fusible elements and configured to allow a second relative displacement of the suspension arm in relation to the engine cradle over a second path only in an event of application, to the wheel or to the suspension arm, of an external force, a longitudinal component of which, measured in a longitudinal direction of the vehicle, exceeds a second predetermined threshold for which the second fusible elements are sized, the second fusible elements comprising at least a portion of the linking fork joint,
 wherein the elements for attaching the suspension arm to the linking fork joint comprise a unit mounted on the suspension arm and in that the second fusible elements comprise a second guide element integral with the linking fork joint configured to guide a second displacement of the unit with respect to the linking fork joint along a trajectory along the second guide element corresponding to said second path and a second locking element configured to break only when the longitudinal component of said external force exceeds the second predetermined threshold, the second displacement of the unit only being allowed in the event of a breakage of the second locking element, and
 wherein the first and second guide elements comprise a guide rail penetrated by at least a portion of said unit, the first and second locking elements being disposed, prior to the breakage of at least one of the first and second locking elements, due to the application of the external force, on either side of said unit in a sliding direction defined by the guide rail.

7. The arrangement as claimed in claim 1, wherein the elements for attaching the suspension arm to the linking fork joint comprise a unit mounted on the suspension arm and wherein the first fusible elements comprise at least one wing to which the unit is attached and configured so as to be plastically deformed only when the lateral component of the external force exceeds the first predetermined threshold, and the plastic deformation of the wing that results accompanies a displacement of the unit along a trajectory in relation to the engine cradle corresponding to said first path.

8. The arrangement as claimed in claim 7, wherein the unit of the elements for attaching the suspension arm to the linking fork joint includes a nut and bolt.

9. The arrangement as claimed in claim 1, further comprising second fusible elements independent of and disassociated from the first fusible elements and configured to allow a second relative displacement of the suspension arm in relation to the engine cradle over a second path only in an event of application, to the wheel or to the suspension arm, of an external force, a longitudinal component of which, measured in a longitudinal direction of the vehicle, exceeds a second predetermined threshold for which the second fusible elements are sized, the second fusible elements comprising at least a portion of the linking fork joint.

10. The arrangement as claimed in claim 9, wherein the second fusible elements are configured to prevent the second relative displacement over the second path when the longitudinal component of the external force is below the second predetermined threshold regardless of a value of the lateral component of the external force measured in the lateral direction of the vehicle.

11. The arrangement as claimed in claim 9, wherein the linking fork joint is configured and inserted with respect to the engine cradle and the suspension arm in such a manner that the second relative displacement over the second path is performed in the lateral direction and in a second direction from the engine cradle towards the wheel.

12. The arrangement as claimed in claim 9, wherein the elements for attaching the suspension arm to the linking fork joint comprise a unit mounted on the suspension arm and in that the second fusible elements comprise a second guide element integral with the linking fork joint configured to guide a second displacement of the unit with respect to the linking fork joint along a trajectory along the second guide element corresponding to said second path and a second locking element configured to break only when the longitudinal component of said external force exceeds the second predetermined threshold, the second displacement of the unit only being allowed in the event of a breakage of the second locking element.

13. The arrangement as claimed in claim 12, wherein the unit of the elements for attaching the suspension arm to the linking fork joint includes a nut and bolt.

14. The arrangement as claimed in claim 1, wherein the attachment of the suspension arm to the engine cradle comprises a ball-joint mounting system different from the linking fork joint, an attachment point conferred by the linking fork joint and an attachment point conferred by the ball-joint mounting system being offset with respect to one another in a longitudinal direction of the vehicle.

15. The arrangement as claimed in claim 14, further comprising a second linking fork joint mounted between the ball joint mounting system and the engine cradle, of a same kind as the linking fork joint linked to the attachment elements but separate therefrom.

16. The arrangement as claimed in claim 1, wherein the attachment elements ensure a ball joint link between the linking fork joint and the suspension arm and the linking fork joint is housed between said ball joint link and the engine cradle.

17. A motor vehicle comprising:
the at least one arrangement according to claim 1.

* * * * *